(12) United States Patent
Stafford

(10) Patent No.: US 6,634,377 B1
(45) Date of Patent: Oct. 21, 2003

(54) ACTUATOR FEED LIMIT VALVE ASSEMBLY

(75) Inventor: Maura Jane Stafford, Grayslake, IL (US)

(73) Assignee: Sonnax Industries, Inc., Bellows Falls, VT (US)

( * ) Notice: Subject to any disclaimer, the term of this patent is extended or adjusted under 35 U.S.C. 154(b) by 54 days.

(21) Appl. No.: 09/939,372

(22) Filed: Aug. 27, 2001

(51) Int. Cl.$^7$ .................. F16H 61/26; F16K 51/00
(52) U.S. Cl. .................. 137/454.2; 137/315.11; 137/315.27; 477/158
(58) Field of Search .................. 137/454.2, 454.6, 137/315.04, 315.11, 315.27, 15.27, 15.19; 192/3.57, 87.13, 87.18; 475/99, 116, 119, 127, 129; 477/158

(56) References Cited

U.S. PATENT DOCUMENTS

| | | | | |
|---|---|---|---|---|
| 2,753,024 A | * | 7/1956 | Weaving et al. | 192/3.57 |
| 4,132,302 A | * | 1/1979 | Chatterjea | 192/87.13 |
| 4,369,677 A | * | 1/1983 | Lewis | 477/158 |
| 4,445,528 A | * | 5/1984 | Miki et al. | 137/315.03 |
| 4,500,301 A | * | 2/1985 | Cadee | 474/28 |
| 4,651,776 A | * | 3/1987 | Nakano et al. | 137/625.69 |
| 4,833,765 A | * | 5/1989 | Bohland | 29/890.124 |
| 4,966,195 A | * | 10/1990 | McCabe | 137/625.61 |
| 5,289,844 A | * | 3/1994 | Stevenson | 137/343 |
| 5,445,042 A | * | 8/1995 | Deady | 477/130 |
| 5,503,601 A | * | 4/1996 | Bastio | 475/116 |
| 5,700,226 A |   | 12/1997 | Droste | 477/156 |

* cited by examiner

*Primary Examiner*—John Rivell
(74) *Attorney, Agent, or Firm*—Clifford F. Rey

(57) ABSTRACT

A replacement actuator feed limit valve assembly, which regulates the flow and pressure of automatic transmission fluid within the actuator feed limit hydraulic circuit in an automotive transmission valve body is disclosed. The present actuator feed limit valve assembly comprises a hard anodized valve piston disposed within a mating, full contact valve sleeve having inlet and exhaust ports disposed about its circumference which increases actuator feed limit circuit control, reduces oscillation, and eliminates side loading and bore wear thereby correcting improper gear starts, soft/delayed shifting and clutch/band failure. The present valve assembly also includes fluid directing structures, which reduce the turbulence of hydraulic fluid passing through the valve. By substitution of alternative compression springs provided in an aftermarket kit format, the present replacement actuator feed limit valve assembly will function in either General Motors 4L60E or 4L80E early and late design transmission valve bodies.

26 Claims, 5 Drawing Sheets

ACTUATOR FEED LIMIT VALVE ASSEMBLY

BACKGROUND OF INVENTION

Field of Invention

The present invention relates generally to the field of hydraulic circuits utilized in automatic transmission systems and, more particularly, to a replacement valve mechanism for an Actuator Feed Limit valve (hereinafter "AFL valve") that regulates pressure within the Actuator Feed Limit circuit (hereinafter "AFL circuit") of the valve body of the transmission.

Automatic transmission systems of the prior art have a hydraulic circuit subsystem which includes at least a hydraulic pump, a valve body having fluid conducting passages or circuits, input and exhaust ports formed within the fluid circuits, and a plurality of so-called spool valves comprised of modified pistons which alternately open and close the ports to regulate the flow and pressure of automatic transmission fluid (hereinafter "ATF") within the fluid circuits to actuate different components of the transmission.

It will be understood that in describing hydraulic circuits, ATF usually changes names when it passes through an orifice or control valve in a specific circuit. U.S. Pat. No. 5,700,226 entitled Hydraulic Lubrication Control System for an Automatic Transmission System is one example of a prior art reference relating to automatic transmission systems, which further explains the functions of such control valves and fluid circuits.

The AFL valve limits hydraulic pressure as ATF passes through the valve and enters the AFL circuit. Spring force acting on the AFL valve limits fluid pressure to a predetermined maximum amount. When line pressure is above this value, Actuator Feed Limit fluid (hereinafter "AFL fluid") pressure moves the AFL valve against spring force to block line pressure and opens the actuator feed to exhaust thereby providing the limiting action.

Leakage can eventually develop within the AFL circuit due to wear between the valve piston and mating bore resulting in low boost pressure, improper gear shifting and clutch/band failure. The same AFL fluid loss results in lower line pressure, which is the main fluid pressure in the hydraulic system.

Thus, the present replacement AFL valve mechanism has been developed to provide a solution to these problems and to resolve other shortcomings of the prior art.

SUMMARY OF THE INVENTION

Accordingly, the present invention is a replacement valve mechanism for the original equipment manufacture (hereinafter "OEM") AFL valve, which is standard equipment on the 4L60E and 4L80E transmissions made available on many vehicles produced by General Motors prior to 2001 and which will be referred to throughout this specification. The function of the AFL valve is to prevent the fluid pressure generated by the AFL circuit from becoming too high, which can result in flooding of the control solenoids and the valve orifices being unable handle the excess pressure.

The OEM design of the prior art AFL valve in the 4L60E and 4L80E transmissions has a large reaction area and is highly affected by side loading (i.e. vertical movement), which can adversely affect the response and accuracy of the valve and tends to wear the mating valve bores within the valve body prematurely.

The present invention provides a replacement valve mechanism comprising an AFL valve including a hard anodized valve piston that resides in a close tolerance, full contact sleeve component that provides inlet and exhaust ports about the entire circumference of the valve. This provides at least 50% more surface contact area than the OEM design and effectively eliminates side-loading of the AFL valve, which enhances AFL circuit control, reduces oscillation, and substantially reduces bore wear. By substitution of alternate compression springs having different spring rates and dimensional characteristics in a kit format, the present replacement AFL valve mechanism will fit either the General Motors 4L60E or 4L80E early and late design transmissions.

Thus, it is an object of the present invention to provide a replacement AFL valve mechanism including a full contact sleeve having inlet and exhaust ports disposed about its circumference, which substantially reduces side loading, bore wear and AFL fluid circuit leakage.

Another object of the present invention is to provide a replacement AFL valve with improved response and accuracy, which reduces torque signal oscillation and AFL fluid oscillation thereby enhancing AFL circuit control.

Another object of the present invention is to provide a replacement AFL valve which will eliminate improper gear starts, soft/delayed shifts, and low line pressure.

Another object of the present invention is to provide a replacement AFL valve in an aftermarket kit format including a reaming tool, which will fit both General Motors 4L60E and 4L80E early and late design transmissions by substitution of alternate compression springs having different spring rate and dimensional characteristics.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
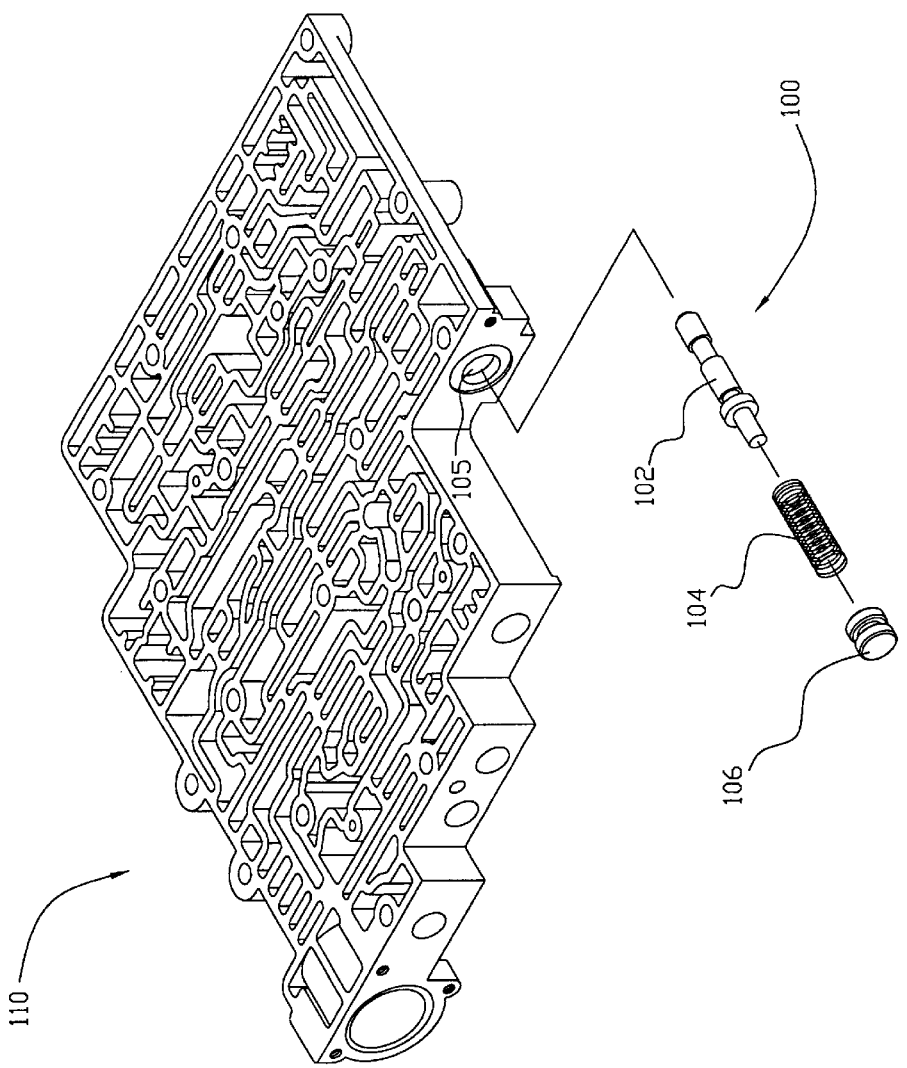
FIG. 1 is a perspective view of the OEM valve body component of a General Motors 4L60E transmission labeled PRIOR ART and indicating the location of the AFL valve shown in exploded view.

With further reference to the drawings there is shown therein an AFL valve of the prior art, indicated generally at 100, and illustrated in FIG. 1. The AFL valve 100 is shown in exploded view and removed from its functional position within a mating bore as at 105 which is machined into the valve body, indicated generally at 110, of the General Motors 4L60E and 4L80E transmissions.

In the prior art the AFL valve 100 comprises a so-called spool valve including a modified, cylindrical piston 102 having a plurality of concentric diameters or spools, a compression spring 104, and an end plug 106 arranged coaxially for installation within the bore 105 as shown. The AFL valve 100 directs line pressure into the AFL circuit. The force of the spring 104 acting on the piston 102 limits AFL fluid pressure to a maximum of approximately 724–862 KiloPascals (kPA) or 105–125 psi. When the line pressure exceeds this value, AFL fluid pressure moves the piston 102 against spring force to block line pressure providing the limiting action. In operation AFL fluid is routed to the shift solenoids, pressure control solenoid, 3-2 solenoid, the 2-3 shift valve train and other hydraulically actuated components to support the functions of the transmission.

The prior art AFL valve 100 has a large reaction area and is highly affected by side loading (i.e. vertical movement) caused by ATF flow into the valve, which wears the mating bore 105 prematurely in the General Motors 4L60E and 4L80E transmissions. As the bore wear increases, fluid pressure is reduced to the shift solenoids, which generates solenoid and slip-ratio codes due to the depletion of hydraulic fluid. If the fluid pressure to the shift solenoids drops below 43–44 pounds per square inch (psi), improper gear starts, faulty gear shifts, and clutch/band failure can occur. Thus, the present invention has been developed to provide a replacement (AFL) valve mechanism to correct this problem and will now be described.

Figure 2:
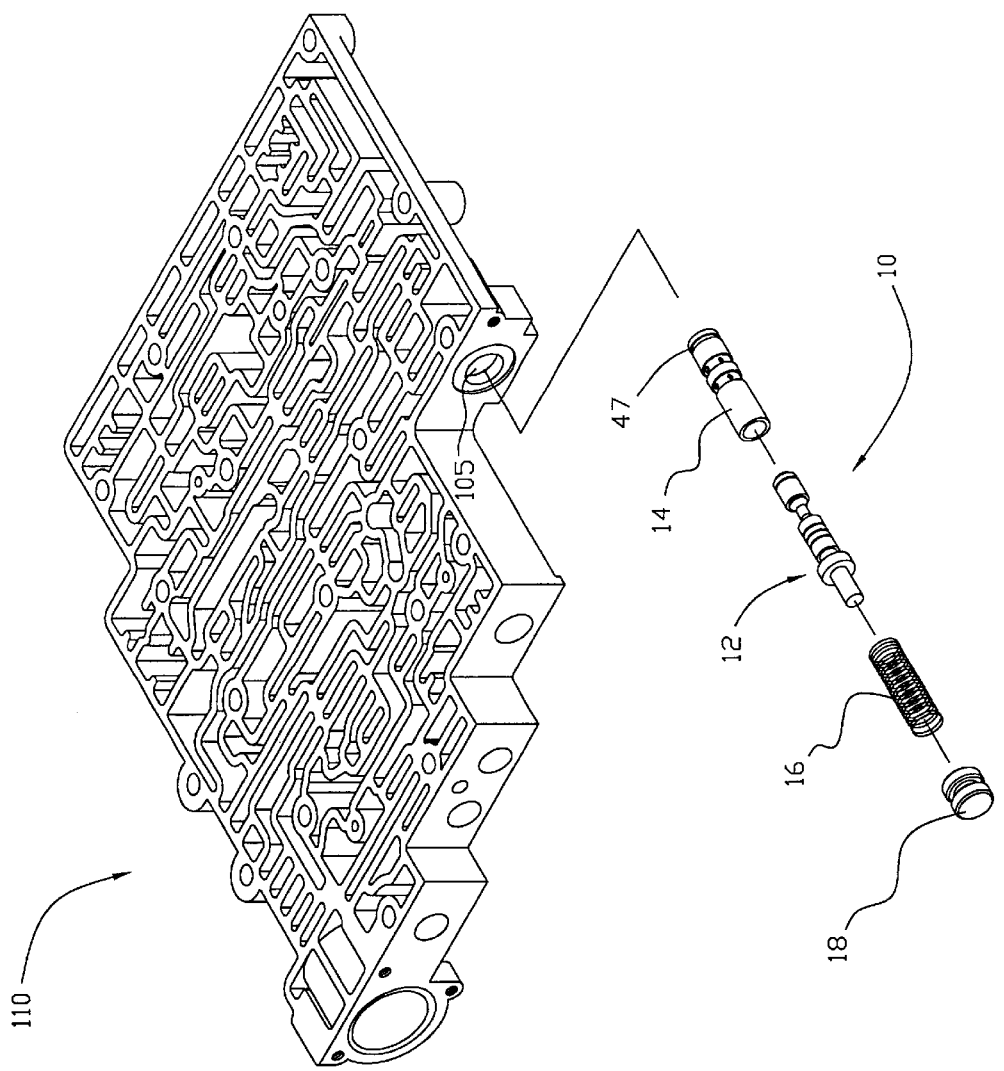
FIG. 2 is a perspective view of the OEM valve body component of FIG. 1 depicting the replacement AFL valve assembly of the present invention in exploded view.

Referring now to FIG. 2 there is shown therein an AFL valve assembly in accordance with the present invention, indicated generally at 10. The present AFL valve assembly 10 is also a spool valve comprised of a valve piston, indicated generally at 12, a cylindrical valve sleeve, indicated generally at 14, a compression spring 16, and the OEM end plug 18 arranged coaxially for installation within the bore 105 as shown. In order to accommodate the present valve sleeve 14, the bore 105 of the OEM valve body 110 is reamed oversize as hereinafter explained.

Figure 3:
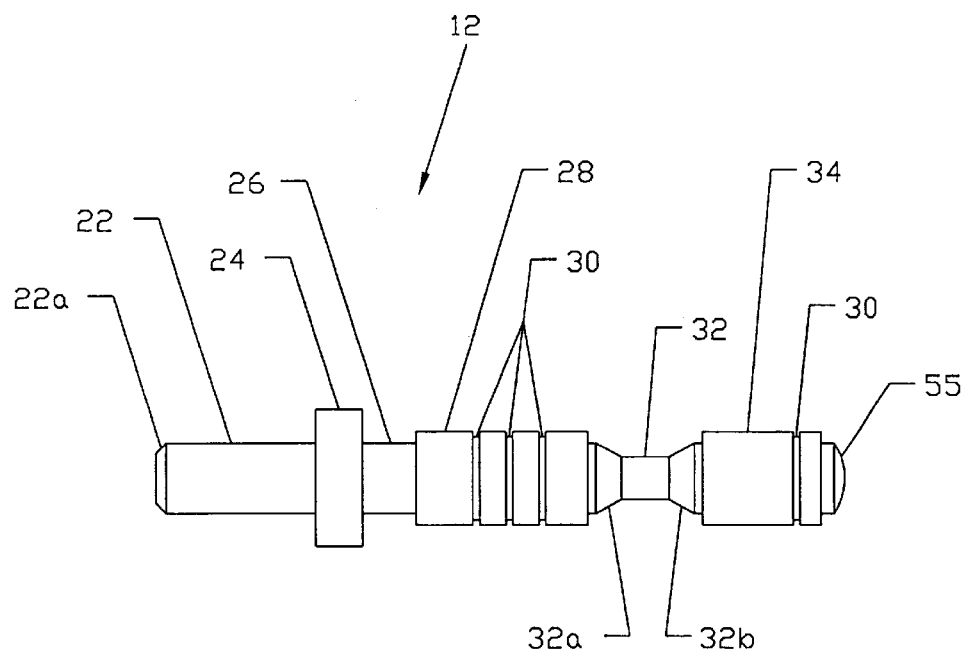
FIG. 3 is an enlarged elevational view of the valve body member of the replacement AFL valve assembly of the present invention.

FIG. 3 illustrates the valve piston 12 showing the structural features thereof in further detail. In the preferred embodiment the valve piston 12 is constructed of 6262-T8/T9 aluminum or other suitable material for this application. The valve piston 12 includes control diameters or spools 28 and 34, which function to regulate the flow of ATF within the valve.

More particularly, valve piston 12 also includes a spring guide diameter 22 of sufficient size to support the compression spring 16 in the position shown. The terminal end 22a of spring guide diameter 22 is chamfered to avoid entanglement with spring 16 during installation. An opposite end of spring guide diameter 22 is integrally connected to a larger stop diameter 24, which functions as a seating surface for spring 16 on a first end face thereof and a stop surface for valve piston 12 on its opposite end face to limit its travel within sleeve 14 during assembly. During actual valve operation this stop surface does not contact sleeve 14.

Compression springs 16 are manufactured from a suitable material in accordance with commercial specifications to provide a specific spring rate and desired operating characteristics for a given valve application. It will be understood that by substitution of alternate compression springs 16 having different spring rates and dimensional characteristics, the present AFL valve mechanism can be installed in either the 4L60E or 4L80E early and late design transmissions.

A relief diameter 26 adjacent stop diameter 24 defines a space to retain lubricant such as Trans Jel or other suitable lubricant, which is applied prior to storage to keep the mating piston 12 and sleeve 14 components together as a matched pair. Relief diameter 26 integrally connects the stop diameter 24 with the adjacent secondary spool 28, which has a plurality of annular grooves 30 formed about its circumference.

In the preferred embodiment three grooves 30 of a predetermined depth are provided. Annular grooves 30 distribute pressure across the circumference of spools 28 and 34 by filling with ATF during operation thereby supporting and centering the valve piston 12 within sleeve 14 and virtually eliminating side loading (i.e. vertical movement) of the valve piston 12 substantially reducing friction and wear.

The present AFL valve 10 incorporates features comprising fluid directing means including, but not limited to, the following structures. A contoured stem 32 integrally connects secondary spool 28 to the adjacent primary spool 34, which also includes a single annular groove 30 for prevention of side loading. It will be appreciated by those skilled in the art that stem 32 is designed to direct the flow of ATF through the valve chamber 60 between the spools 28 and 34 to reduce fluid turbulence. More particularly, both ends of the stem 32 include radially outward, tapered surfaces 32a and 32b adjoining the spools 28 and 34 respectively, which function to direct the flow of ATF entering valve chamber 60 via ports 46 in the direction of exit ports 45.

Figure 5A:
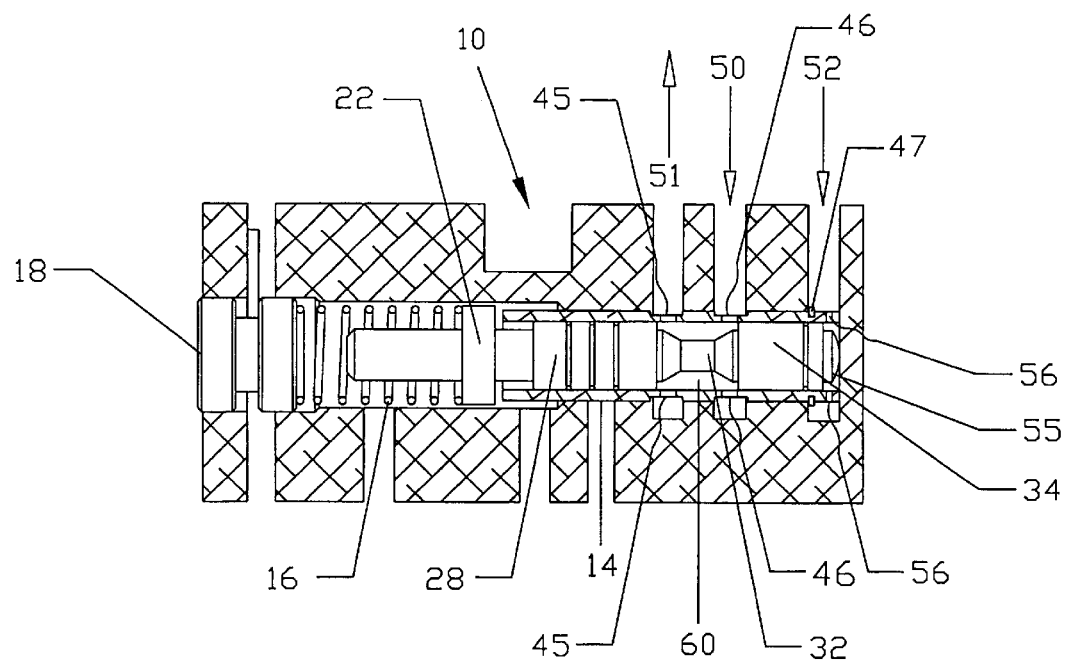
FIG. 5 is a diagrammatic view of the present replacement AFL valve assembly shown in its functional position within a section of the valve body.

In the preferred embodiment the tapered surfaces of the stem 32 are formed in the range of 25–35 degrees to the longitudinal axis -A- as shown. The valve piston 12 also includes a convex protuberance 55 formed on an opposite end face of spool 34 which serves to stop the valve piston 12 as it comes into contact with the internal wall of the valve body 110 within the ATF balance circuit 52 as shown in FIG. 5A. In addition, the convex protuberance 55 provides an optimal reaction surface, which enhances the response and accuracy of the present valve 10.

The valve piston 12 is coated with a hard anodized finish in accordance with MWL-A-8625, Type III, Class 2, to produce 0.02+/−0.01 (metric) build up per surface, which significantly reduces wear and increases longevity.

Figure 4:
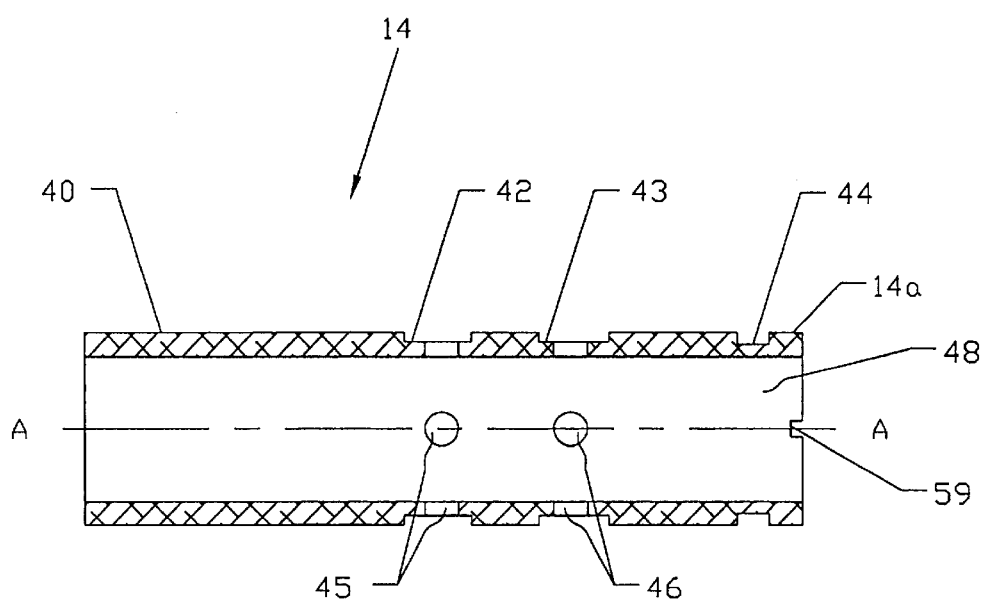
FIG. 4 is an enlarged longitudinal cross-section of the valve sleeve of the replacement AFL valve assembly of the present invention.

FIG. 4 illustrates the valve sleeve 14 showing its structural features in further detail. The valve sleeve 14 is constructed of 4032-T6/T651/T86 aluminum. This type of aluminum has been selected after much experimentation and has been demonstrated to provide optimal wear characteristics when used with the hard anodized finish in accordance with MIL-A-8625, Type III, Class 2.

Sleeve 14 is comprised of a cylindrical body 40 including a central bore 48 and having a pair of grooves 42 and 43 formed about its circumference, which function as ATF conduits. Each groove 42 and/or 43 respectively includes a plurality of ports 45 and 46 formed therein and extending through the sleeve body 40 and into valve chamber 60 for the entry and/or exit of ATF during operation.

In the preferred embodiment ports 45 and 46 are oriented at 90 degree angles to each other and are substantially perpendicular to the center axis -A- of the sleeve 14. In this configuration the flow of ATF into the valve chamber 60 is distributed to the valve ports 46 under line pressure about the entire circumference of the valve sleeve 14 virtually eliminating side loading (i.e. vertical motion) and the resulting leakage it produces in the AFL circuit.

Figure 5B:
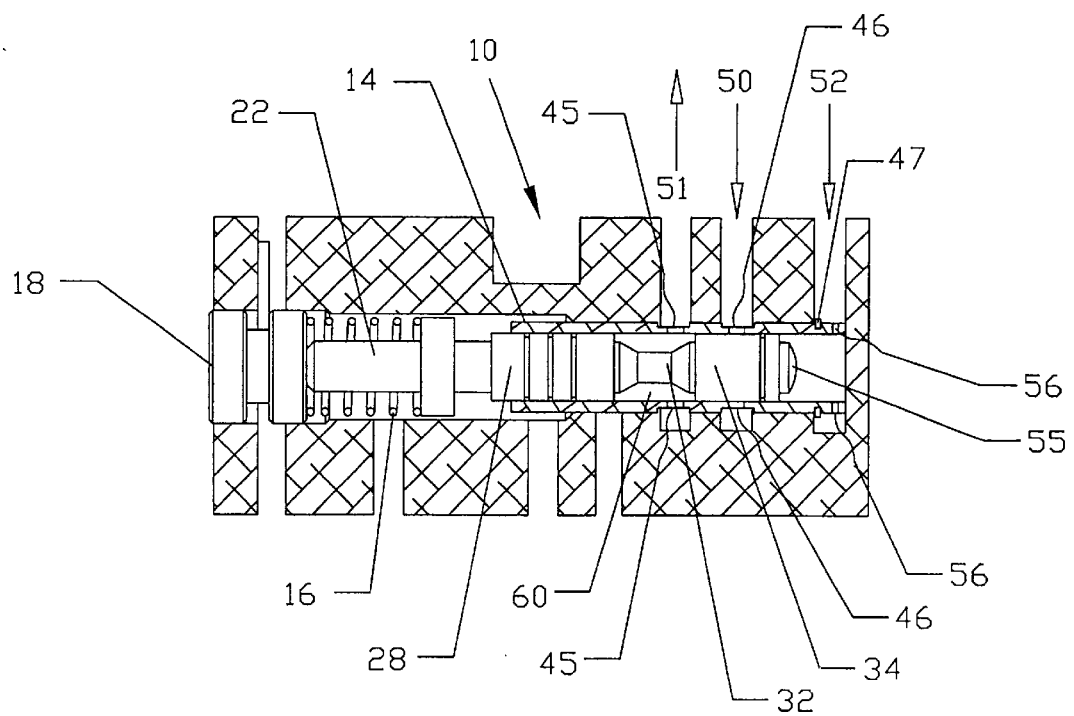

The sleeve body 40 also includes an annular groove 44 formed about its circumference to a predetermined depth, which serves as a receptacle for the retaining clip 47 (FIGS. 5A and 5B). Once the sleeve 14 is inserted within the valve body 110, the retaining clip 47 is installed within annular groove 44 to retain the sleeve 14 in position within the valve body 110.

Referring to FIGS. 5A and 5B, the function of the replacement AFL valve assembly 10 will now be described. The present AFL valve assembly 10 is normally spring-biased to the open position shown in FIG. 5A, which permits the flow of ATF into the valve assembly at line pressure. The force of the spring 16 acting on the valve piston 12 limits AFL fluid pressure to a maximum of approximately 724–862 KiloPascals (kPA) or 105–125 psi.

More particularly, ATF is picked up by the hydraulic pump (not shown), is delivered under pressure to line circuit 50, and enters the AFL valve assembly 10 as shown by directional arrow via the ports 46. Ports 46 are disposed in alignment with the line circuit 50 after the sleeve 14 has been installed within the valve body 110 as shown. In operation ATF passes into the valve chamber 60 and exits via ports 45 as shown by directional arrow passing into the AFL circuit 51 and also into AFL balance circuit 52 as indicated by directional arrows. Pressure sensing orifices 56 or, in an alternative embodiment, end grooves 59 (FIG. 4) formed in the terminal end 14a of the sleeve 14 meter the flow of ATF to the reaction surface of the valve piston 12 defined by the convex protuberance 55.

If the fluid pressure within AFL balance circuit 52 exceeds the maximum limit specified for the General Motors 4L60E and 4L80E transmissions (i.e. 105–125 psi), the ATF pressure acts against the force of the spring 16 to move the valve piston 12 to the closed position shown in FIG. 5B such that primary spool 34 blocks ports 46 closing the ports to line pressure from line 50. This results in a decrease in fluid pressure in the AFL circuit and, in particular, in the AFL balance circuit 52, which causes the valve piston 12 to return to the open position shown in FIG. 5A. This oscillating motion of the valve piston 10 is repeated to maintain ATF pressure in the AFL circuits 51 and 52 within the predetermined pressure limit (105–125 psi) for the 4L60E and 4L80E transmissions.

Figure 6:
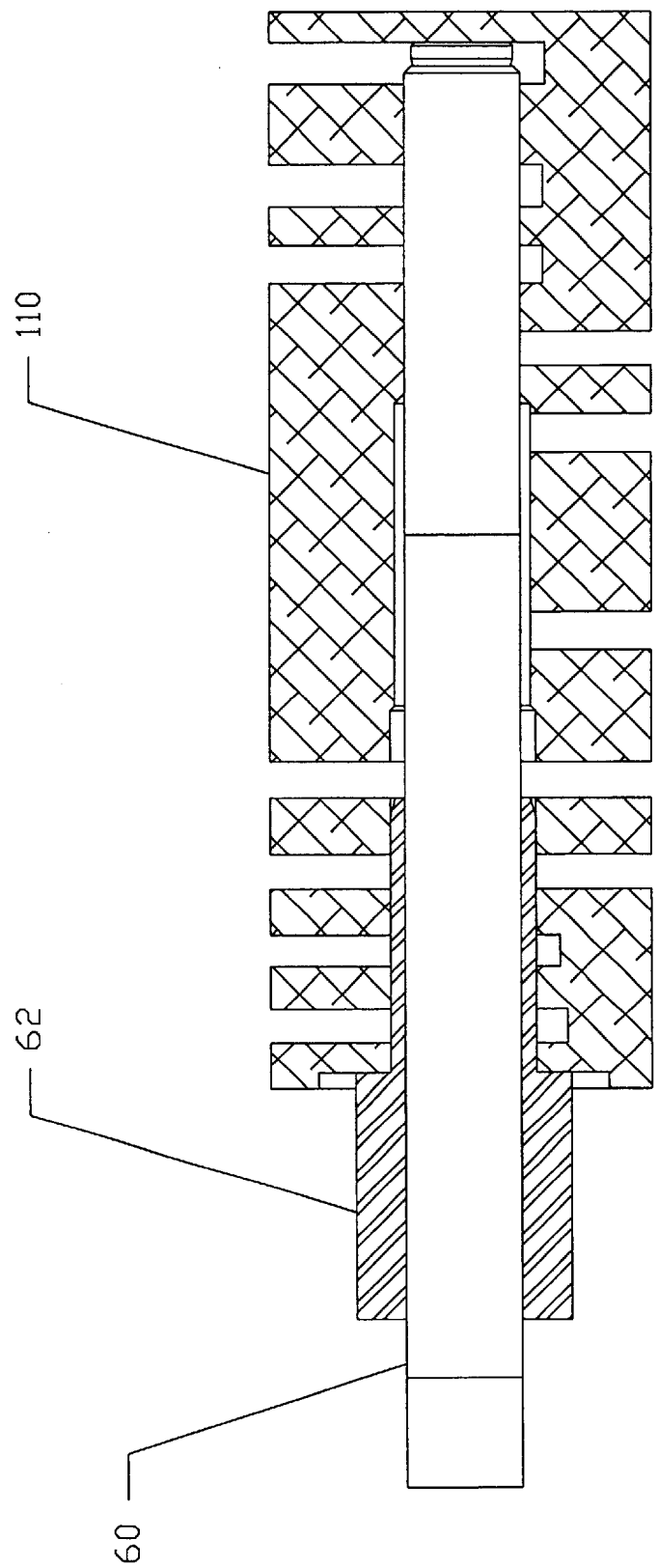
FIG. 6 is a diagrammatic view of the reaming tool and jig required for installation of the present replacement AFL valve assembly in the General Motors 4L60E transmission valve body.

Referring now to FIG. 6, an installation procedure specifically for the 4L60E valve body will be described. It will be understood that slight dimensional differences between the 4L60E and 4L80E valve bodies requires pre-drilling the bore 105 in the 4L80E valve body, but otherwise the installation procedure is substantially similar.

Initially, the OEM valve 100 is removed from the valve body 110 and discarded. Next, the valve bore 105 within the valve body 110 is reamed oversize using a reaming tool 60 and reaming jig 62 as provided in the 4L60E aftermarket kit and shown in FIG. 6. Thereafter, any chips and/or debris are removed from the valve body. Next, the valve sleeve 14 is inserted into the valve body 110 and secured in position by installing the retaining clip 47 within groove 44 thereby securing the valve sleeve 14 in the position shown in FIGS. 5A and 5B. Thereafter, the lubricated valve piston 12 and spring 16 are inserted into the valve sleeve 14 and the end plug 18 is installed and secured with the OEM retaining clip (not shown).

Thus, it can be seen that the design of the present replacement AFL valve assembly 10 as described hereinabove provides an AFL valve that is resistant to side loading and substantially reduces wear thereby reducing AFL circuit leakage, which can result in improper gear starts, soft/delayed shifts and clutch/band failure. Further, the close tolerance fit within the mating valve sleeve 14 and the hard anodized finish applied to valve piston 12 also increases longevity and eliminates costly replacement of the OEM valve body.

The substitution of alternate compression springs 16 having different spring rates and dimensional characteristics in an aftermarket kit format including a reaming tool and jig permits the installation of the replacement AFL valve assembly 10 of the present invention within the valve body of either of General Motors 4L60E or 4L80E early and late design transmissions.

Although not specifically illustrated in the drawings, it should be understood that additional equipment and structural components will be provided as necessary and that all of the components described above are arranged and supported in an appropriate fashion to form a complete and operative AFL valve mechanism incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An actuator feed limit valve assembly for installation in a transmission valve body having an actuator feed limit circuit for conducting hydraulic fluid to the hydraulically actuated components of a transmission, said actuator feed limit valve assembly comprising:

a cylindrical valve sleeve having a plurality of inlet and a plurality of exhaust ports arranged in a radial pattern at predetermined axial locations;

a valve piston having a primary spool diameter and a secondary spool diameter formed thereon, said valve piston further including fluid directing means comprising a stem portion interconnecting said primary spool diameter and a secondary spool diameter, said stem portion having symmetrical, radially-outward tapering ends measuring in the range of 25 to 35 degrees to the longitudinal axis of said valve piston, said valve piston being disposed within said sleeve and being capable of axial movement from an open to a closed position in relation to said ports;

a spring-biasing means disposed in contact with said valve piston such that said valve piston is biased to said open position and is movable to said closed position in response to a predetermined maximum fluid pressure within said actuator feed limit circuit; and retaining means for securing said valve assembly within said valve body of the transmission.

2. The actuator feed limit valve assembly of claim 1 wherein said valve piston includes a plurality of annular grooves formed about said primary and said secondary spool diameters for retaining hydraulic fluid to redistribute pressure across the entire circumference of said spool diameters during operation.

3. The actuator feed limit valve assembly of claim 2 wherein said primary spool diameter includes a reaction surface on its terminal end face, said reaction surface having a convex protuberance formed thereon providing increased surface area for exposure to said fluid pressure.

4. The actuator feed limit valve assembly of claim 1 wherein said valve piston includes a hard anodized finish in accordance with military specification MIL-A-8625, Type III, Class 2.

5. The actuator feed limit valve assembly of claim 4 wherein said valve sleeve is fabricated from 6262 T8/T9 aluminum providing a low coefficient of friction between said piston and said sleeve.

6. The actuator feed limit valve assembly of claim 1 wherein said plurality of inlet and exhaust ports respectively are oriented at 90 degree intervals about the circumference of said valve sleeve.

7. The actuator feed limit valve assembly of claim 6 wherein a circumferential groove is formed in fluid communication with each radial pattern of said inlet and exhaust ports respectively.

8. The actuator feed limit valve assembly of claim 7 wherein said valve sleeve includes an annular groove formed therein to a predetermined depth about the circumference of a first end thereof, said groove receiving a retaining clip for capturing said sleeve within said valve body.

9. The actuator feed limit valve assembly of claim 1 wherein said spring-biasing means includes a compression spring having a spring rate capable of counterbalancing fluid pressure in the range of 115–125 pounds per square inch.

10. The actuator feed limit valve assembly of claim 9 wherein said spring is selected from a plurality of alternative compression springs having different spring rates and dimensional characteristics in an aftermarket kit format.

11. The actuator feed limit valve assembly of claim 1 wherein said retaining means includes at least one retaining clip disposed in locking relation to said sleeve.

12. An improved valve body for an automotive transmission, said valve body defining a plurality of hydraulic fluid circuits including an actuator feed limit circuit for delivering hydraulic fluid to hydraulically actuated components of said transmission, said valve body further including a plurality of spool valves functioning to regulate the flow and pressure of said fluid, wherein the improvement comprises:

a replacement actuator feed limit valve assembly including a valve piston having a primary spool diameter and a secondary spool diameter, said valve piston further including fluid directing means comprising a stem portion interconnecting said primary spool diameter and said secondary spool diameter, said stem portion having symmetrical, radially-outward tapering ends measuring in the range of 25 to 35 degrees to the longitudinal axis of said valve piston, said valve piston being disposed within a mating valve sleeve having a plurality of inlet and exhaust ports, said piston being capable of movement from an open to a closed position relative to said ports, spring-biasing means disposed in contact with said valve piston such that said valve piston is spring-biased to said open position and is movable to said closed position in response to a predetermined maximum fluid pressure within said actuator feed limit circuit, and retaining means for capturing said valve assembly within said valve body.

13. The improved valve body of claim 12 wherein said spring-biasing means includes a compression spring having a spring rate capable of counterbalancing a fluid pressure in the range of 115 to 125 pounds per square inch.

14. The improved valve body of claim 13 wherein said compression spring is selected from a plurality of alternative compression springs having different spring rates and dimensional characteristics in an aftermarket kit format.

15. An actuator feed limit valve assembly for installation in a transmission valve body having an actuator feed limit circuit for conducting hydraulic fluid to the hydraulically actuated components of a transmission, said actuator feed limit valve assembly comprising:

a cylindrical valve sleeve having a plurality of inlet ports and a plurality of exhaust ports arranged in radial patterns at predetermined axial locations thereon;

a valve piston comprised of a plurality of spool diameters interconnected by at least one contoured valve stem for directing the flow of said fluid within the valve chamber in the direction of said exhaust ports to reduce fluid turbulence within said valve chamber;

a compression spring disposed in contact with said valve piston such that said valve piston is spring biased to an open position and is movable to a closed position relative to said ports in response to a predetermined maximum fluid pressure within said actuator feed limit circuit; and a retaining clip disposed in locking relation to said sleeve for securing said valve assembly within said valve body of the transmission.

16. The actuator feed limit valve assembly of claim 15 wherein said at least one contoured valve stem is disposed between a primary spool diameter and a secondary spool diameter, said contoured valve stem having symmetrical outwardly tapering ends adjoining said spool diameters.

17. The actuator feed limit valve assembly of claim 16 wherein said tapering ends measure in the range of 25 to 35 degrees to the longitudinal axis of said valve piston.

18. The actuator feed limit valve assembly of claim 16 wherein said valve piston includes a plurality of annular grooves formed about said primary and said secondary spool diameters for retaining hydraulic fluid to redistribute pressure across the entire circumference of said spool diameters during operation.

19. The actuator feed limit valve assembly of claim 18 wherein said primary spool diameter includes a reaction surface on its terminal end face, said reaction surface having a convex protuberance formed thereon providing increased surface area for exposure to said fluid pressure.

20. The actuator feed limit valve assembly of claim 15 wherein said valve piston includes a hard anodized finish in accordance with military specification MIL-A-8625, Type III, Class 2.

21. The actuator feed limit valve assembly of claim 20 wherein said valve sleeve is fabricated from 6262 T8/T9 aluminum providing a low coefficient of friction between said piston and said sleeve.

22. The actuator feed limit valve assembly of claim 15 wherein said plurality of inlet ports and exhaust ports respectively are oriented at 90 degree intervals about the circumference of said valve sleeve.

23. The actuator feed limit valve assembly of claim 22 wherein a circumferential groove is formed in fluid communication with each of said radial patterns of said inlet ports and said exhaust ports respectively.

24. The actuator feed limit valve assembly of claim 23 wherein said valve sleeve includes an annular groove formed therein to a predetermined depth about the circumference of a first end thereof, said groove receiving said retaining clip for capturing said sleeve within said valve body.

25. The actuator feed limit valve assembly of claim 15 wherein said compression spring has a calibrated spring rate capable of counteracting fluid pressure in the range of 115–125 pounds per square inch.

26. The actuator feed limit valve assembly of claim 25 wherein said spring is selected from a plurality of alternative compression springs having different spring rates and dimensional characteristics in a kit format.

* * * * *